United States Patent [19]
Weinberger et al.

[11] Patent Number: 5,817,712
[45] Date of Patent: Oct. 6, 1998

[54] SELF-CROSSLINKING AQUEOUS DISPERSIONS OF POLYESTERS AND VINYL POLYMERS

[75] Inventors: Manfred Weinberger, Graz, Austria; Joachim Zoeller, Sant Just-Barcelona, Spain

[73] Assignee: Vianova Resins GmbH, Mainz-Kastel, Germany

[21] Appl. No.: 882,081

[22] Filed: Jun. 25, 1997

[30]  Foreign Application Priority Data

Jun. 27, 1996 [DE] Germany ............ 196 25 774.3

[51] Int. Cl.⁶ .................................................. C08L 67/00
[52] U.S. Cl. ........................ 524/513; 524/190; 524/431; 525/166; 525/167
[58] Field of Search ................................. 524/513, 190, 524/431; 525/166, 167

[56]  References Cited

FOREIGN PATENT DOCUMENTS

WO92/02583  2/1992  WIPO.
94/01478  1/1994  WIPO.

*Primary Examiner*—Terressa Mosley
*Attorney, Agent, or Firm*—Foley & Lardner

[57]  ABSTRACT

Self-crosslinking aqueous polymer dispersions comprising water-thinnable polyesters, vinyl polymers that have either carbonyl or hydrazine functional groups, and a crosslinker having at least two hydrazine or other groups which react with carbonyl groups or crosslinkers having at least two carbonyl groups; and where the vinyl polymer is prepared by free-radical-initiated emulsion polymerization in the presence of an aqueous solution or dispersion of the polyester.

23 Claims, No Drawings

SELF-CROSSLINKING AQUEOUS DISPERSIONS OF POLYESTERS AND VINYL POLYMERS

BACKGROUND OF THE INVENTION

1. Field of the Invention

The invention relates to self-crosslinking aqueous dispersions comprising hydrophilically modified polyesters and vinyl polymers prepared by emulsion polymerization in the presence of aqueous solutions or dispersions of these polyesters. The crosslinking is brought about by addition of suitable bi-or polyfunctional compounds, and the crosslinking reaction takes place through the reaction of carbonyl groups with amino, hydrazino or hydrazido groups.

2. Description of Related Art

Aqueous dispersions of linear polyesters and vinyl polymers are known, for example from WO-A 94/01478, but the coatings produced from them have inadequate resistance to attack by solvents, water, and aqueous alkalis and acids.

SUMMARY OF THE INVENTION

There exists a need to modify binders of this related art so that their overall resistance properties are improved, and an object of the invention therefore is to prepare binders having improved resistance properties. In accordance with the objects of the invention, there are provided self-crosslinking aqueous dispersions prepared by introducing carbonyl groups or amino, hydrazino or hydrazido groups into the vinyl polymers by incorporation of suitable monomers during polymerization or by polymer-analogous reaction. A crosslinker, which, if the polymers are modified with carbonyl groups, contains at least two amino, hydrazino or hydrazido groups, and if not, contains at least two carbonyl groups, is added to the dispersion.

In achieving these objects, there are provided self-crosslinking aqueous polymer dispersions whose solid polymer comprises mass fractions of (A) from about 10 to about 90%, preferably from about 35 to about 87%, particularly preferably from about 60 to about 85%, of a water-thinnable polyester whose repeat units are linked via carbonyloxy bridges, where up to 80% of these bridges may be replaced by carboxamide bridges, having a solution viscosity of the solid polymer (40% solution of the solid polymer in N-methylpyrrolidone; 25° C.) of >300 mPas, preferably >600 mPas, particularly preferably >900 mpas, and (B) from about 90 to about 10%, preferably from about 65 to about 13%, particularly preferably from about 40 to about 15%, of a vinyl polymer comprising the following mass fractions:

(B1) from 0 to about 90%, preferably from 10 to 80%, of repeat units derived from styrene and/or its mono-or polyalkylated derivatives having from 1 to 10 carbon atoms in each alkyl group and/or from substituted styrenes selected from hydroxystyrene and halostyrenes such as chloro-, cyano-and bromostyrene, (B2) from 0 to about 60%, preferably from 10 to 50%, of repeat units derived from one or more hydroxyalkyl esters of acrylic, methacrylic, crotonic or isocrotonic acid, or repeat units derived from one or more bis (hydroxyalkyl) esters of an $\alpha,\beta$-olefinically unsaturated dicarboxylic acid selected from maleic, fumaric, itaconic, citraconic, mesaconic and methylenesuccinic acids, (B3) from 0.5 to about 20%, preferably from 1 to 15%, particularly preferably from 2 to 10%, of repeat units derived from one or more vinyl monomers (B31) having a carbonyl function or from one or more vinyl monomers (B32) having an amino, hydrazido or hydrazino group, and (B4) from 0 to about 90%, preferably from 5 to 50%, of repeat units derived from one or more alkyl esters of an $\alpha,\beta$-olefinically unsaturated carboxylic acid or from one or more dialkyl esters of an $\alpha,\beta$-olefinically unsaturated dicarboxylic acid, and (B5) from 0 to about 30%, preferably from 2 to 25%, of repeat units derived from vinyl monomers, other than vinyl monomers (B31) or (B32) selected from vinyl esters of linear, branched or cyclic aliphatic monocarboxylic acids having from 1 to 20 carbon atoms, from vinyl ethers, vinyl halides and nitriles of $\alpha,\beta$-olefinically unsaturated carboxylic acids, and (C) a crosslinker selected from crosslinkers (C1) having at least two groups which react with carbonyl groups and which are selected from primary amino groups, hydrazino and hydrazido groups, and crosslinkers (C2) having at least two carbonyl groups, where crosslinkers (C1) are employed when vinyl monomers (B31) are used and crosslinkers (C2) are employed when vinyl monomers (B32) are used, and the amount of crosslinker is chosen so that the molar amount of the reactive groups in the crosslinker (C) is from 65 to 130%, preferably from 70 to 120%, particularly preferably from 85 to 110%, and very particularly preferably from 90 to 100%, of the molar amount of the reactive groups in the repeat units (B3) in the polymer, and where the vinyl polymer (B) is prepared by free-radical-initiated emulsion polymerization in the presence of an aqueous solution or dispersion of the polymer (A), and where there may be formation of graft copolymers having graft branches derived from monomers (B1) to (B5) on a graft backbone of polyester (A). The term solid polymer in this context is taken to mean the polymer fraction in the dispersion, i.e., without water, crosslinker or any other additives.

Further objects, features, and advantages of the invention will be readily apparent upon review of the detailed description that follows.

DETAILED DESCRIPTION OF PREFERRED EMBODIMENTS

The polyester (A) can be prepared by polycondensation of bifunctional organic hydroxy compounds (A1), dibasic organic carboxylic acids (A2), optionally organic hydroxy compounds with functionality of at least three (A3), optionally organic carboxylic acids with functionality of at least three (A4), optionally organic hydroxycarboxylic acids (A5) and organic compounds (A6) having at least two functional groups selected from hydroxyl, carboxyl, amino and mercapto groups and at least one sulfonic or phosphonic acid group. The organic hydroxy compounds (A1) may also be replaced up to a molar proportion of 80% by organic amines (A7) having two amino groups or by organic hydroxyamines (A9) each having a primary or secondary amino group and a hydroxyl group, where the amino group is preferably a primary amino group which is bonded to an aliphatic carbon atom. Up to 80% of the molar amount of the optionally employed hydroxycarboxylic acids (A5) may likewise be replaced by aminocarboxylic acids (A8). Reactive derivatives of the above-mentioned compounds may optionally be employed in place of the compounds themselves, for example, the carboxylic acids may be replaced by their anhydrides, halides or isopropenyl esters, and the alcohols by their esters, in particular their acetates. Lactones may be employed in place of the hydroxycarboxylic acids, and lactams or salts of diamines and dicarboxylic acids in place of the aminocarboxylic acids. Examples of components which are suitable for the synthesis of the polyesters (A) and each of which may be employed individually or in a mixture are:

Useful organic dihydroxy compounds (A1) include any dibasic organic carboxylic acids capable of being condensed to form polyester (A). Particularly preferable are those in which the hydroxyl groups are aliphatically bonded, selected from linear, branched and cycloaliphatic dihydroxy compounds having from 2 to 40 carbon atoms and the polyoxyalkylene glycols having degrees of polymerization up to 100, where the alkylene radical is selected from the group consisting of ethylene, 1,2-and 1,3-propylene and 1,4-butylene. Examples of suitable compounds include ethylene glycol, 1,2-and 1,3-propylene glycol, 1,4-butanediol, 1,6-hexanediol, neopentyl glycol, pinacol, cyclohexanedimethanol, perhydrogenated bisphenol A and perhydrogenated bisphenol F, 1,4-dihydroxycyclohexane, diethylene glycol, triethylene glycol, oligomeric and polymeric polyoxyethylene glycols, polyoxypropylene glycols and polyoxybutylene glycols, where copolymers with e.g., oxyethylene and oxypropylene units are also included. Subordinate amounts, for example, mass fractions up to 3%, of bis(hydroxymethyl) aromatics, such as 1,4-bis (hydroxymethyl)benzene or 1,2-bis(hydroxymethyl)furan may also be employed. When polyoxyalkylene glycols having a molar proportion of>20% of oxyethylene groups in the oxyalkylene groups are used, the resultant polyester begins to have hydrophilic character.

A mass fraction of from 1 to 20%, preferably from 3 to 10%, of the dihydroxy compounds can be replaced by trihydroxy compounds or polyols (A3) of higher functionality. Suitable trihydroxy compounds include any trihydroxy compound capable of being condensed, preferably, the trihydroxy compounds or polyols include linear or branched or cyclic aliphatic trihydroxy compounds having from 3 to 20 carbon atoms, such as glycerol, trimethylolethane and trimethylolpropane, and suitable hydroxy compounds with higher functionality are erythritol, pentaerythritol, sorbitol and mannitol.

Suitable acids (A2) include the organic dicarboxylic acids and other organic acids having two acid groups that are capable of being condensed to form polyester (A), and preferably include acids, selected from the group consisting of carboxyl, sulfonic acid, sulfinic acid, phosphonic acid and phosphinic acid groups. Suitable dibasic acids include linear, branched or cycloaliphatic diacids and aromatic and mixed aliphatic-aromatic diacids having from 2 to 40 carbon atoms. Examples of suitable diacids are oxalic acid, malonic acid, succinic acid, adipic acid, glutaric acid, pimelic acid and suberic acid, dimeric fatty acids, such as dimeric oleic acid and elaidic acid and mixtures of naturally occurring unsaturated fatty acids which have been dimerized. Examples of aromatic diacids are the isomeric phthalic acids o-, iso-and terephthalic acid and 2,3-and 2,6-naphthalenedicarboxylic acid.

A mass fraction of from 1 to 10%, preferably from 3 to 6%, of the diacids may be replaced by acids having basicity of at least 3 or their anhydrides (A4), for example trimellitic acid, trimesic acid, pyromellitic acid or naphthalenetetracarboxylic dianhydride.

Suitable organic hydroxyacids (A5) include aliphatic and aromatic hydroxyacids that are capable of being condensed to form polyester (A), and preferably those that have a hydroxyl and a carboxyl group and from 2 to 20, preferably from 3 to 12, carbon atoms, and which may also optionally be employed as lactone. Examples are γ-hydroxybutyric acid, δ-hydroxypentanoic acid, ε-hydroxyhexanoic acid, the lactones of these acids, p-hydroxybenzoic acid and 2-hydroxynaphthalene-6-carboxylic acid. For the purposes of the invention, it also is possible to employ subordinate amounts of hydroxyacids each having more than one hydroxyl or acid group. From 1 to 20% of the amount of substance of hydroxyacids (A5) each having one acid and one hydroxyl group preferably is replaced by hydroxyacids each having at least one acid group and at least one hydroxyl group, where at least two functional groups from one of the two types of group are present.

The compounds (A6) include any compounds that are capable of being condensed to form polyesters (A), and preferably include those that comprise two hydroxyl, amino or carboxyl groups or their salts, or two different groups selected from the group consisting of hydroxyl, amino and carboxyl groups, and at least one sulfonic acid or phosphonic acid group. Some or all of the more strongly acidic of the acid groups may also be neutralized. Examples of suitable compounds are taurine, glycol sulfonic acids and their derivatives, in particular ethoxylated sulfoisophthalic acid and sulfoterephthalic acid, sulfosuccinic acid, 4-amino-3-hydroxy-1-naphthalenesulfonic acid, 4,5-dihydroxy-2,7-naphthalenedisulfonic acid, 2,5-diaminobenzenesulfonic acid, 2,5-dihydroxy-1,4-benzenedisulfonic acid, 2,3-dimercaptopropanesulfonic acid, 4-amino-5-hydroxy-1-naphthalenesulfonic acid and 6,7-dihydroxy-2-naphthalenesulfonic acid and their alkali metal, ammonium and alkaline earth metal salts. The amount of compounds (A6) in the polyester can be adjusted so that the resultant polyester is water-soluble or water-dispersible. The term water-soluble polyester in this context denotes a polyester whose saturated aqueous solution at 25° C. has a mass fraction of at least 5% of dissolved polyester. The term water-dispersible polyester in this context denotes a polyester which forms an aqueous dispersion having a mass fraction of at least 5% of dispersed polyester, from which no visible sediment forms after storage at room temperature for 24 hours.

The compounds (A7) include any organic diamines capable of being condensed to form polyesters (A), and preferably include those having two primary or secondary amino groups, whose organic radical is aliphatic or aromatic or araliphatic. Up to 10% of the amount of substance of the diamines may be replaced by triamines or amines with higher functionality. Preference may be given to aliphatic diamines having from 2 to 40 carbon atoms and which are linear, cyclic or branched, among which primary diamines are particularly preferred. Examples of suitable compounds are ethylenediamine, trimethylene-diamine, tetramethylenediamine, 1,6-diaminohexane, 2,2,4-trimethyl-1,6-hexanediamine, isophoronediamine, cyclohexanediamine, 1,3-and 1,4-bis(aminomethyl)-cyclohexane and TCD-diamine. Araliphatic diamines in which the amino groups are bonded to aliphatic carbon atoms, such as m-and p-xylylenediamine, are likewise suitable. Polyiminoalkylene amines of the type diethylenetriamine, triethylenetetramine and tetraethylenepentamine are, particularly suitable.

The compounds (A8) include aminocarboxylic acids, each preferably having one amino group and one carboxyl group. Aliphatic linear or branched ω-aminocarboxylic acids, such as β-aminopropionic acid, γ-aminobutyric acid, δ-aminopentanoic acid and ε-aminohexanoic acid are particularly preferred. The three last-named acids also may advantageously be employed in the form of their lactams.

The compounds (A9) preferably each comprise one amino group, preferably a primary amino group, and one hydroxyl group, where up to 10% of the amount of substance of these preferred monohydroxymonoamines may be replaced by compounds respectively having more than one hydroxyl and amino group. They can have in total from 2 to 36 carbon atoms and may be employed individually or in a mixture. The primary amino group is preferably bonded to an aliphatic carbon atom. Examples of suitable compounds (A9) are ethanolamine, hydroxypropylamine, 1,3-diaminopropanol, 4-amino-1-butanol, diethanolamine, diisopropanolamine and triethanolamine.

The polyesters (A) can be prepared in any known manner by condensation in the melt or in solution. Solution condensation is especially suitable when reactive derivatives of the above-mentioned compounds (e.g., acid chlorides) are used, otherwise condensation in the melt is preferred. The reaction in the melt may be accelerated by the conventional catalysts, such as alkaline earth metal oxides, transition metal salts and transition metal oxides, in particular, for example, compounds of manganese, titanium, vanadium, germanium and tin.

A preferred procedure is to dissolve the polyester, after the condensation, in at least one of the monomers (B1), (B4) or (B5). Other monomers which can be used may be added before the start of polymerization or during the polymerization.

The polyesters may be neutralized after their synthesis by adding a stoichiometric amount of base, or at least 1%, preferably at least 5%, and particularly preferably at least 20%, of the stoichiometric amount of base. The bases which may be used include aqueous solutions of alkali metal hydroxides, alkaline earth metal hydroxides or ammonia, and also organic amines, such as ethanolamine, dimethylethanolamine, triethylamine, triethylenetetramine, diethylamine or N,N-dimethylaminopropylamine. The neutralized or partially neutralized polyesters (A) then are dissolved in water, the mass fraction of polyester in the solution being from 10 to 70%, preferably from 20 to 60%, and particularly preferably from 30 to 55%. If salts of the compounds (A6) are employed in synthesizing the polyesters (A), the neutralization step can be omitted. By this means, dispersions may be obtained which are free from the amines otherwise used for neutralization. Those skilled in the art are capable of producing polyesters (A) using the guidelines provided herein.

The mixture of the monomers from the group (B1) to (B5) can be dispersed all at once in the solution of the polyester; the initiator can be added previously, simultaneously or subsequently. However, it also is possible to disperse only a part of the monomers in the aqueous solution, adding only a part or the entire amount of initiator, and adding the remainder of the monomer mixture and, together with this mixture or separately, any further initiator, continuously or little by little during the course of the polymerization. The formulation of the monomer mixture here can be varied so that the resultant polymers are chemically inhomogeneous.

A further preferred procedure includes first dissolving the polyesters (A) in an organic solvent and then adding at least one of the monomers (B1) to (B5), and dispersing this mixture in water; the polyester here is particularly preferably not separated as a solid polymer, but dissolved in an organic solvent following polycondensation. Suitable solvents include moderately polar aprotic and protic solvents such as N-methylpyrrolidone, butyl glycol and methoxypropanol.

It also is possible to begin by dissolving the initiator alone in water and then dispersing the polyester and the monomers, together or separately, into the solution. The polymerization can be initiated by heating the solution to a temperature at which there is an adequate rate of free-radical formation from the initiator. During the course of the polymerization, the temperature may be raised or lowered and the type of initiator which is being metered in may be varied. It also is possible by this means to prepare polymers which are inhomogeneous in their degree of polymerization, with wider or narrower distribution of the degree of polymerization. One of the determining factors for this is the rate of breakdown of peroxidic or azo initiators as a function of the selected temperature and the rate of recombination of the resultant free-radicals compared with the rate of addition of further monomer to the polymer radical.

The mean degree of polymerization may likewise be influenced by the addition of regulators, for example mercaptans, such as dodecyl mercaptan or hexanedithiol.

The polymerization can be initiated by suitable initiators in general use and known for use in free-radical aqueous emulsion polymerization. These are usually water-soluble free-radical-forming compounds, for example hydrogen peroxide, peracetic acid, perbenzoic acid or peroxodisulfates, for example potassium peroxodisulfate and ammonium peroxodisulfate, perphosphates, peroxocarbonates and hydroperoxides, such as tert-butyl hydroperoxide. Preference also is given to combined systems comprising at least one (preferably organic) reducing agent and at least one peroxide and/or hydroperoxide, e.g., sodium persulfate and sodium formaldehydesulfoxylate or tert-butyl hydroperoxide and the sodium salt of hydroxymethanesulfinic acid or hydrogen peroxide and ascorbic acid. Other suitable redox catalyst systems are, for example, cumene hydroperoxide and sodium metabisulfite or sulfur dioxide and ammonium persulfate or ascorbic acid and tert-butyl hydroperoxide.

Particular preference also is given to combined systems which, furthermore, include a small amount of a metal compound which is soluble in the polymerization medium and whose metallic component can occur in a number of valence states, e.g., ascorbic acid/iron(II) sulfate/hydrogen peroxide, where in place of ascorbic acid the sodium salt of hydroxymethanesulfinic acid, sodium sulfite or sodium bisulfite and in place of hydrogen peroxide alkali metal peroxodisulfates and/or ammonium peroxodisulfates are frequently used. In place of a water-soluble iron(II) salt, a vanadium salt or a combination of water-soluble iron salts and vanadium salts is frequently used.

Other suitable compounds include azo compounds, such as 4,4-azobis(cyanopentanoic acid). The catalysts are used in the usual catalytically active concentrations. These are in general mass fractions of from 0.01 to 4.0% based on the mass of the dispersion. The mass fraction of the free-radical initiator systems which are employed, based on the total mass of the monomers to be polymerized, is preferably from 0.1 to 2%. Those skilled in the art are capable of selecting a suitable initiator to initiate the polymerization of polyesters (A) using the guidelines provided herein.

Other components which typically are used for emulsion polymerization may be used in particular embodiments, for example pH buffers and any other constituents which are capable of also being used in the reaction mixture alongside the polymer (A), containing acid groups, of the invention. Such constituents include, for example, salts for pH adjustment, such as $NaHCO_3$, $Na_2CO_3$, sodium acetate, Na$_2$HPO$_4$ or other phosphates, carbonates or citrates, which can contribute to pH stabilization. Additives of this type may be present in the dispersion with mass fractions of up to 3%, as long as their addition does not impair the quality of the dispersion. In carrying out the emulsion polymerization, it is advantageous, besides establishing an initial polymer concentration, to carry out prepolymerization of a mass fraction of from 1 to 15% of the initiator-monomer mixture, in order to control more precisely the quality of the dispersion, in particular with respect to transparency and viscosity (decoupling of the phases of polymer particle formation and polymer particle growth).

The monomers (B1) useful in the invention include styrene derivatives or preferably styrene itself. Of the alkylated styrenes which may be added to the unsubstituted styrene in mass fractions of from 5 to 50%, preference is given to the use of α-methylstyrene, the different methylstyrenes in which the methyl group is attached to the benzene nucleus itself, particularly preferably the commercial mixture of the different isomers which is termed vinyltoluene, as well as ethylstyrene, dimethylstyrene and tert-butylstyrene.

The monomers (B2) useful in the invention include hydroxyalkylesters of α,β-olefinically unsaturated carboxylic acids selected from acrylic, methacrylic, crotonic and isocrotonic acids or bis(hydroxyalkyl) esters of an α,β-olefinically unsaturated dicarboxylic acid selected from the group consisting of maleic, fumaric, itaconic, citraconic, mesaconic and methylene succinic acids and mixtures of these. Preference is given to hydroxyalkyl acrylates and hydroxyalkyl methacrylates having from 2 to 8 carbon atoms in the alkyl radical, in particular, hydroxyethyl acrylate and hydroxypropyl acrylate and methacrylate. Monoesters of trihydric and polyhydric alcohols with an α,β-olefinically unsaturated carboxylic acid are also suitable, for example glycerol mono(meth)acrylate and trimethylol mono(meth)acrylate. Bis(hydroxyalkyl) esters of an α,β-olefinically unsaturated dicarboxylic acid selected from the group consisting of maleic, fumaric, itaconic, citraconic, mesaconic and methylene succinic acids are also suitable.

The monomers (B3) useful in the invention include olefinically unsaturated monomers, preferably aliphatic, olefinically monounsaturated monomers having from 4 to 20, preferably from 5 to 15 carbon atoms and at least one carbonyl function i.e., an aldehyde or ketone group (B31), or having at least one primary amino group or a hydrazino or hydrazido group (B32). Suitable monomers (B31) includes diacetoneacrylamide, vinyl acetoacetate, vinyl pyruvate, acrolein, methacrolein, crotonaldehyde, vinylbenzaldehyde, vinyl alkyl ketones with from 1 to 8 carbon atoms in the alkyl group, such as vinyl methyl ketone, vinyl ethyl ketone, vinyl isobutyl ketone, vinyl amyl ketone and 2-ethylhexyl vinyl ketone, the methacrylic and acrylic esters of 3-hydroxypropionaldehyde, which on one or both of the carbon atoms of the propionaldehyde moiety may be substituted with alkyl groups each having from 1 to 4 carbon atoms, and (meth)acrylamidopivalinaldehyde, diacetone (meth)acrylate, acetoacetoxyethyl (meth)acrylate, and the acetoacetates of 1,4-butanediol mono(meth)acrylate and 1,2-and 1,3-propanediol mono(meth)acrylate.

Suitable monomers (B32) include vinyl monomers having at least one primary amino group, for example aminoethylacrylamide and other aminoalkyl-substituted amides of olefinically unsaturated carboxylic acids, amino-substituted styrenes, and amino-substituted (meth)acrylates and (meth) acrylamides derived respectively from aliphatic alcohols and primary aliphatic amines having from 1 to 8 carbon atoms. Mixtures of the monomers (B31) and (B32) may also be used, but it is preferable on each occasion to use exclusively monomers of the type (B31) or (B32) and not both types simultaneously.

Copolymers having hydrazine groups generally are not obtainable directly by copolymerization using monomers containing hydrazine groups and other vinyl monomers, since hydrazine groups tend to crosslink. Such copolymers may be prepared by polymer-analogous reaction of functional copolymers having acid chloride groups or ester groups with hydrazine or its monoalkyl derivatives. The functional copolymers can be obtained, for example, by copolymerization of small amounts of (meth)acrylyl chloride or crotonyl chloride with other vinyl monomers selected from the classes (B1), (B2) and (B4). Esters formed from lower alcohols having from 1 to 4 carbon atoms in the alkyl group with α,β-olefinically unsaturated carboxylic acids, such as methyl methacrylate, ethyl acrylate, butyl acrylate, etc., are particularly suitable for the hydrazinolysis.

The monomers (B4) useful in the invention include alkyl esters of an α,β-olefinically unsaturated carboxylic acid or dialkyl esters of an α,β-olefinically unsaturated dicarboxylic acid, where the alkyl group may be linear, cyclic or branched and has from 1 to 20, preferably from 1 to 12, carbon atoms. Examples of suitable compounds include esters formed from acids selected from the group consisting of acrylic, methacrylic, crotonic, isocrotonic and vinylacetic acids with alcohols selected from the group consisting of methanol, ethanol, n-propanol, isopropanol, n-butanol, isobutanol, sec- and tert-butanol, amyl alcohol, hexyl alcohol, 2-ethylhexyl alcohol, stearyl alcohol and palmityl alcohol, and also the diesters of the abovementioned alcohols with maleic, fumaric, itaconic, citraconic or mesaconic acid.

The monomers (B5) useful in the invention, from which mass fractions of from 0 to about 30%, preferably from 2 to 25% of the repeat units in the polymer (B) are derived include those selected from vinyl esters of linear, branched or cyclic aliphatic monocarboxylic acids having from 1 to 20 carbon atoms, vinyl ethers, vinyl halides and nitriles of α,β-olefinically unsaturated carboxylic acids. Suitable compounds include vinyl acetate, vinyl propionate, vinyl butyrate, vinyl esters of aliphatic monocarboxylic acids which are branched in the α-position, have an average of from 5 to 20 carbon atoms in the carboxylic acid and are, for example, commercially obtainable under the trade name ®Versatic Acid 5 or 10 ("Vinyl versatate 5" and "vinyl versatate 10"); also vinyl chloride, vinyl methyl ether, vinyl benzyl ether, acrylonitrile and methacrylonitrile. Those skilled in the art are capable of using suitable combinations of monomers (B1)–(B5) to formulate polymer (B) using the guidelines provided herein.

The dispersions of the invention comprising the polymers (A) and (B) can have a solids mass fraction of from 20 to 80, preferably from 30 to 70%.

The crosslinkers (C) may have at least two reactive groups which can react with the functional groups in the monomers or in the repeat units of (B3). The functionality of the crosslinker preferably should be selected so as to be complementary to the functionality of the polymer (B). The amount of the crosslinker preferably is gauged so that the amount of substance of the reactive groups of the crosslinker (C) is from 65 to 130%, preferably from 70 to 120%, particularly preferably from 85 to 110%, and very particularly preferably from 90 to 100% of the amount of substance of the reactive groups in the functional monomers or repeat units (B3). The type of crosslinker employed typically depends on the presence of repeat units (B31) or (B32) in the polymer (B). If the polymer (B) has reactive groups of the carbonyl type, a crosslinker (C1) can be selected which has at least two groups which react with carbonyl groups and which are selected from the group consisting of primary amino groups, hydrazino and hydrazido groups. Suitable compounds are: hydrazine itself, alkylenebishydrazines, such as 1,2-dihydrazinoethane and 1,4-dihydrazinobutane, dihydrazides of aliphatic or aromatic dicarboxylic acids having from 2 to 40 carbon atoms, such as carbonic, oxalic, malonic, succinic, glutaric, adipic, pimelic and suberic acid bishydrazides, cyclohexanedicarboxylic acid bishydrazide, the bishydrazides of phthalic, isophthalic and terephthalic acids and the bishydrazides of dimeric fatty acids, and the bissemicarbazides of α,β-alkylenediamines having from 2 to 40 carbon atoms in the linear, branched or cyclic alkylene radical and of aromatic diamines, such as the isomeric phenylenediamines.

Small amounts of hydrazine compounds with higher functionality may also be employed (mass fractions of up to 5%, based on the mass of all hydrazine compounds). Examples of such compounds include trihydrazides of aromatic tricarboxylic acids, such as trimellitic acid and trimesic acid, nitrilotriacetic acid trihydrazide, pyromellitic acid tetrahydrazide and ethylenediaminetetraacetic acid tetrahydrazide. Crosslinkers (C2) with at least two carbonyl groups can be employed if the polymer has functional groups of the amino or hydrazino type. Suitable compounds include dialdehydes and diketones having from 2 to 40 carbon atoms, preferably from 3 to 20 carbon atoms; small amounts (up to a mass fraction of 5%, based on the mass of all carbonyl compounds) of carbonyl compounds with a functionality of 3 or higher may also be employed. Examples of suitable dialdehydes are glyoxal, malonaldehyde, glutaraldehyde and succinaldehyde; suitable diketones are acetylacetone, acetonylacetone, and an example of a triketone is the diacetate of diacetone alcohol.

The resultant aqueous dispersions can be used as binders in coatings for plastics, metals, wood, paper, board, porous substrates, such as leather, fabrics, webs and mineral substrates, such as stone, tiles, porcelain, stoneware or concrete. Adhesives for the abovementioned substrates may also be formulated using the novel dispersions. The skilled artist is capable of using the aforementioned aqueous dispersion as binders in coatings for plastics, etc. using the guidelines provided herein.

The coatings produced from the novel dispersions have good gloss and good resistance to water, acids, alkalis and organic liquids. Their resistance properties are significantly improved in comparison with the coatings known, for example, from WO-A 94/01478.

The following examples elucidate the invention. In these examples, the acid number (AN) is determined according to DIN 53 402 as the mass of KOH in mg, based on the mass of the solid under consideration in g, which is required for neutralization of 1 g of this solid. The hydroxyl number (OHN) according to DIN 53 240 indicates the mass of KOH in mg, based on the mass of the solid (g) under consideration, or which has the same number of hydroxyl groups as 1 g of the solid under consideration.

EXAMPLE 1

Dispersion of Dissolved Polyester

Neopentyl glycol (350 g), 130 g of ethylene glycol, 80 g of trimethylolpropane, 320 g of terephthalic acid, 320 g of isophthalic acid and 50 g of sulfoisophthalic acid Na salt were charged to a flask fitted with a column and a distillation head and slowly heated to 210° C. without allowing the head temperature to exceed 100° C. After 3 hours at 210° C., the acid number of the polymer was determined. If the acid number was less than 10 mg/g, the reaction mixture was cooled to 140° C. and 130 g of adipic acid is added, otherwise the condensation was continued. The temperature again was slowly increased to 210° C., and at this temperature a reduced pressure of about 5 kPa (50 mbar) was applied for 1 hour, after which the reaction vessel was flushed with nitrogen and the reaction mixture poured out into a metal container. The OHN of the polyester was about 60 mg/g and the acid number about 1 mg/g.

The resultant polymer (320 g) was precharged and heated to 120° C., and 80 g of butyl glycol were added. As soon as the solution was homogeneous, it was cooled to 90° C., and 600 g of warm water were added, with stirring, and then the resultant dispersion was cooled to 80° C. At this temperature, 0.06 g of ammonium peroxodisulfate in aqueous solution was added. Beginning after 5 minutes, a monomer mixture of 35 g of styrene and 2 g of diacetone acrylamide was then metered in at an even rate over 1 hour at 80° C., after which 0.03 g of ammonium peroxodisulfate was added, and stirring continued for a further 2 hours. The dispersion then was cooled to 30° C., and 0.9 g of adipic acid dihydrazide in aqueous solution was added.

EXAMPLE 2

Dispersion of Dissolved Polyester

Neopentyl glycol (369 g), 447 g of ethylene glycol, 407 g of terephthalic acid, 533 g of tert-butylisophthalic acid and 45 g of sulfoisophthalic acid Li salt were charged to a flask fitted with a column and a distillation head and slowly heated to 210° C. without allowing the head temperature to exceed 100° C. After 2 hours at 210° C., the acid number of the polymer was determined. If the acid number was less than 10 mg/g, a reduced pressure of about 3 kPa (30 mbar) was applied for 2 hours, otherwise the condensation was continued, after which the reaction vessel was flushed with nitrogen and the reaction mixture poured out into a metal container. The viscosity of the 40% solution of the polymer in N-methylpyrrolidone was 700 mPas, and the AN about 5 mg/g.

The resultant polymer (320 g) was precharged and heated to 120° C., and 80 g of butyl glycol were added. As soon as the solution was homogeneous, it was cooled to 90° C., and 600 g of warm water were added, and then the dispersion was cooled to 80° C. At this temperature, 0.06 g of ammonium peroxodisulfate in aqueous solution was added. After 5 minutes, a monomer mixture of 35 g of styrene, 15 g of hydroxyethyl methacrylate and 2 g of diacetone acrylamide was then metered in with stirring at an even rate over 1 hour at 80° C., after which 0.03 g of ammonium peroxodisulfate was added, and stirring continued for a further 2 hours. The dispersion then was cooled to 30° C., and 0.9 g of adipic acid dihydrazide in aqueous solution was added.

EXAMPLE 3

Dispersion of Polyester Dissolved in Solvent and Monomers

Ethylene glycol (100 g), 520 g of neopentyl glycol, 200 g of trimethylolpropane, 25 g of lauric acid, 560 g of isophthalic acid, 100 g of isononanoic acid and 50 g of sulfoisophthalic acid Li salt were charged to a flask fitted with a column and a distillation head and slowly heated to 210° C. without allowing the head temperature to exceed 100° C. After 3 hours at 210° C., the acid number of the polymer was determined. If the acid number was less than 10 mg/g, a reduced pressure of about 5 kPa (50 mbar) was applied at 210° C. for 2 hours, otherwise the condensation was continued, after which the reaction vessel was flushed with nitrogen and the reaction mixture poured out into a metal container. The OHN of the polyester was about 85 mg/g and the acid number about 8 mg/g.

The resultant polymer (320 g), 80 g of butyl glycol, 20 g of butyl methacrylate, 30 g of methyl methacrylate and 3 g of diacetone acrylamide were precharged and heated to 80° C. As soon as the solution was homogeneous, it was dispersed, with stirring, in 600 g of warm water, and then the dispersion was cooled to 60° C., and 0.27 g of tert-butyl hydroperoxide and 0.22 g of ascorbic acid in aqueous solution were added.

After 3 hours at 60° C. with stirring, a further 0.08 g of tert-butyl hydroperoxide and 0.08 g of ascorbic acid in aqueous solution were added and stirring continued for 1 hour. The dispersion then was cooled to 30° C., and 1.3 g of adipic acid dihydrazide in aqueous solution were added.

EXAMPLE 4

Dispersion of Solvent-Free Polyester in Water

Ethylene glycol (100 g), 240 g of neopentyl glycol, 200 g of terephthalic acid, 285 g of isophthalic acid and 60 g of sulfoisophthalic acid sodium salt were charged to a flask fitted with a column and a distillation head and slowly heated to 210° C. without allowing the head temperature to exceed 120° C. After an acid number of less than 10 mg/g had been reached, a reduced pressure of 100 mbar was applied and maintained at 210° C. until the acid number had declined to less than 10 mg/g. A reduced pressure of 6 kPa (60 mbar) then was applied and maintained for 1 h at 230° C., after which the reaction vessel was flushed with nitrogen and the reaction mixture poured out into a metal container. The viscosity of a 40% solution of the polymer in N-methylpyrrolidone was 400 mPas, and the acid number about 2 mg/g.

The resultant polymer (400 g) was dispersed in 850 g of hot water at 95° C., until a homogeneous solution was achieved. The latter was cooled to 80° C. and mixed with 0.1 g of ammonium peroxodisulfate. After 3 minutes, a monomer mixture of 30 g of glycidyl methacrylate, 30 g of tert-butyl methacrylate, 5 g of isobornyl methacrylate, 10 g of hydroxyethyl methacrylate and 5 g of diacetone acrylamide then was metered in, with stirring, at an even rate over 3 hours at 75° C., after which 0.03 g of ammonium peroxodisulfate was added and stirring continued at 80° C. for a further 2 hours. The dispersion then was cooled to 30° C., and 1.1 g of adipic acid dihydrazide in aqueous solution were added.

EXAMPLE 5

Isolation of Polyester as Solution and Subsequent Dispersion in Water

Ethylene glycol (300 g), 140 g of neopentyl glycol, 385 g of isophthalic acid and 40 g of sulfoisophthalic acid lithium salt were charged to a flask fitted with a column and a distillation head and slowly heated to 210° C. without allowing the head temperature to exceed 140° C. After an acid number of less than 10 mg/g had been reached, a reduced pressure of 10 kPa (100 mbar) was applied and maintained at 210° C. until the acid number had declined to less than 1 mg/g. A reduced pressure of 3 kPa (30 mbar) then was applied and maintained for 2 h at 210° C., after which the reaction vessel was flushed with nitrogen, the reaction mixture was cooled to 150° C. and, with further cooling, dissolved in 160 g of butyl glycol. The viscosity of a 40% solution of the solid polymer in N-methylpyrrolidone was 380 mPas, and the acid number about 1 mg/g.

The resultant polymer solution (200 g) was dispersed in 425 g of hot water at 95° C., until a homogeneous solution was achieved. The latter was cooled to 80° C. and mixed with 0.1 g of ammonium peroxodisulfate. After 3 minutes, a monomer mixture of 30 g of styrene, 30 g of glycidyl methacrylate, 10 g of hydroxyethyl methacrylate and 5 g of diacetone acrylamide was then metered in, with stirring, at an even rate over 4 hours at 75° C., after which 0.03 g of ammonium peroxodisulfate was added and stirring continued at 80° C. for a further 2 hours. The dispersion then was cooled to 30° C., and 1.1 g of adipic acid dihydrazide in aqueous solution were added.

All of the dispersions obtained according to these examples, even in low layer thicknesses (10–40 μm), provided glossy coatings which are free from surface defects. The crosslinked coatings (30 minutes at 80° C.) were resistant to water, alcohols, fats and household cleaning agents.

The present invention has been described by reference to particularly preferred embodiments and examples. Those skilled in the art recognize, however, that various modifications can be made to the present invention without significantly departing from the spirit and scope thereof.

Priority application German 19625774.3 filed on Jun. 27, 1996, including the specification, claims and abstracts is hereby incorporated by reference.

What is claimed is:

1. A self-crosslinking aqueous polymer dispersion comprising mass fractions in the solids of:
   (A) from about 10 to about 90% of a water-thinnable polyester whose repeat units are linked via carbonyloxy bridges, where up to 80% of these bridges may be replaced by carboxamide bridges, the water-thinnable polyester having a solution viscosity (40% solution in N-methylpyrrolidone; 25° C.) of >300 mPas;
   (B) from about 90 to about 10% of a vinyl polymer comprising in turn the following mass fractions;
      (B1) from 0 to about 90% of repeat units derived from (i) styrene, (ii) styrene's mono- or polyalkylated derivatives having from 1 to 10 carbon atoms in each alkyl group, or (iii) from substituted styrenes selected from hydroxystyrene or halostyrenes selected from the group consisting of chloro-, cyano- and bromostyrene,
      (B2) from 0 to about 60% of repeat units derived from one or more hydroxyalkyl esters of acrylic, methacrylic, crotonic or isocrotonic acid, or from one or more bis(hydroxyalkyl) esters of an α,β-olefinically unsaturated dicarboxylic acid selected from the group consisting of maleic, fumaric, itaconic, citraconic, mesaconic and methylenesuccinic acids,
      (B3) from 0.5 to about 20% of repeat units derived from one or more vinyl monomers (B31) having a carbonyl function or from one or more vinyl monomers (B32) having an amino, hydrazido or hydrazino group, (B4) from 0 to about 90% of repeat units derived from one or more alkyl esters of an $\alpha,\beta$-olefinically unsaturated carboxylic acid or one or more dialkyl esters of an $\alpha,\beta$-olefinically unsaturated dicarboxylic acid, and (B5) from 0 to about 30% derived from other vinyl monomers selected from the group consisting of vinyl esters of linear, branched or cyclic aliphatic monocarboxylic acids having from 1 to 20 carbon atoms, vinyl ethers, vinyl halides and nitriles of $\alpha,\beta$-olefinically unsaturated carboxylic acids; and (C) a crosslinker selected from crosslinkers (C1) having at least two groups which react with carbonyl groups and which are selected from the group consisting of primary amino groups, hydrazino and hydrazido groups, or crosslinkers (C2) having at least two carbonyl groups, where crosslinkers (C1) are employed when vinyl monomers (B31) are used and crosslinkers (C2) are employed when vinyl monomers (B32) are used, and the amount of crosslinker is selected so that the amount of substance of the reactive groups in the crosslinker (C) is from 65 to 130% of the amount of substance of the reactive groups in the repeat units (B3) in the polymer, and wherein the vinyl polymer (B) is prepared by free-radical-initiated emulsion polymerization in the presence of an aqueous solution or dispersion of the polymer (A).

2. A self-crosslinking aqueous polymer dispersion as claimed in claim 1, wherein the dispersion further comprises mass fractions of up to 20% of solvent(s) based on the mass of the solid polymer from (A) and (B).

3. A self-crosslinking aqueous polymer dispersion as claimed in claim 1, wherein the dispersion is solvent-free.

4. A self-crosslinking aqueous polymer dispersion as claimed in claim 1, which further comprises graft copolymers having graft branches derived from at least one of monomers (B1) to (B5) on a graft backbone of polyester (A).

5. A self-crosslinking aqueous polymer dispersion as claimed in claim 1, wherein up to 80% of the carbonyloxy bridges of the polyester (A) are replaced by carboxamide bridges.

6. A self-crosslinking aqueous polymer dispersion as claimed in claim 1, wherein the polyester (A) is prepared by polycondensation of (A1) bifunctional organic hydroxy compounds, (A2) dibasic organic acids and (A6) organic compounds having at least two functional groups selected from the group consisting of hydroxyl, carboxyl, amino and mercapto groups and at least one sulfonic acid or phosphonic acid group.

7. A self-crosslinking aqueous polymer dispersion as claimed in claim 4, wherein the starting materials used to prepare the polyester (A) also include at least one selected from the group consisting of (A3) organic hydroxy compounds having functionality of at least three, (A4) organic carboxylic acids which are at least tribasic and (A5) organic hydroxycarboxylic acids.

8. A self-crosslinking aqueous polymer dispersion as claimed in claim 6, wherein up to 80% of the amount of substance of the compounds (A1) are replaced by organic diamines (A7) and/or by organic hydroxyamines (A9) having a primary or secondary amino group and a hydroxyl group.

9. A self-crosslinking aqueous polymer dispersion as claimed in claim 6, wherein a mass fraction of from 1 to 20% of the bifunctional organic hydroxy compounds (A1) is replaced by organic hydroxy compounds (A3) having functionality of at least 3.

10. A self-crosslinking aqueous polymer dispersion as claimed in claim 6, wherein a mass fraction of from 1 to 20% of the dibasic organic acids (A2) is replaced by organic carboxylic acids (A4) having basicity of at least 3.

11. A self-crosslinking aqueous polymer dispersion as claimed in claim 1, wherein the vinyl polymers (B) are prepared by free-radical-initiated emulsion polymerization in a partially or completely neutralized aqueous solution or dispersion of the polyesters (A).

12. A self-crosslinking aqueous polymer dispersion as claimed in claim 1, wherein the vinyl polymers (B) have repeat units derived from (B1) styrene.

13. A self-crosslinking aqueous polymer dispersion as claimed in claim 1, wherein the vinyl polymers (B) have repeat units derived from one or more compounds (B2) selected from the group consisting of hydroxyethyl acrylate, hydroxyethyl methacrylate, hydroxypropyl acrylate and hydroxypropyl methacrylate.

14. A self-crosslinking aqueous polymer dispersion as claimed in claim 1, wherein the vinyl polymers (B) have repeat units derived from one or more compounds (B31) selected from the group consisting of diacetone acrylamide, vinyl acetoacetate, vinyl pyruvate, acrolein, methacrolein and crotonaldehyde.

15. A self-crosslinking aqueous polymer dispersion as claimed in claim 1, wherein the vinyl polymers (B) have repeat units derived from one or more compounds (B32) selected from the group consisting of aminoethylacrylamide, amino-substituted (meth)acrylic esters and amino-substituted (meth)acrylamides which are derived, respectively, from aliphatic alcohols and primary aliphatic amines having from 1 to 8 carbon atoms.

16. A self-crosslinking aqueous polymer dispersion as claimed in claim 1, wherein the vinyl polymers (B) have repeat units derived from one or more compounds (B4) selected from the group consisting of methyl (meth)acrylate, ethyl (meth)acrylate, 2-ethylhexyl (meth)acrylate, dimethyl maleate and diethyl maleate.

17. A self-crosslinking aqueous polymer dispersion as claimed in claim 1, wherein the vinyl polymers (B) have repeat units derived from one or more compounds (B5) selected from the group consisting of vinyl acetate, vinyl propionate, vinyl versatate 5 and 10, vinyl chloride and (meth)acrylonitrile.

18. A self-crosslinking aqueous polymer dispersion as claimed in claim 1, wherein the monomers (B3) employed have carbonyl groups and the crosslinkers (C) are selected from the group consisting of hydrazine, succinic acid bishydrazide, glutaric acid bishydrazide and adipic acid bishydrazide.

19. A self-crosslinking aqueous polymer dispersion as claimed in claim 1, wherein the vinyl polymers (B) have repeat units having amino or hydrazino functions, and the crosslinkers (C) are selected from the group consisting of glyoxal, malonaldehyde, acetylacetone and acetonylacetone.

20. A self-crosslinking aqueous amine-free polymer dispersion as claimed in claim 6, wherein, for synthesis of the polyester A, compounds (A6) are employed in the form of their alkali metal salts, alkaline earth metal salts or ammonium salts, and wherein there is no neutralization by addition of amine.

21. A process for producing a self-crosslinking aqueous polymer dispersion as claimed in claim 1, comprising polymerizing a mixture of vinyl monomers selected from the group consisting of the monomers (B1) to (B5) in an aqueous solution or dispersion of a polyester (A) in the presence of free-radical initiators.

22. The process as claimed in claim 21, wherein the polyester (A) is condensed and then dissolved in a solvent selected from the group consisting of N-methylpyrrolidone, butyl glycol methoxypropanol and mixtures thereof, and then is dispersed in water, and then a part or all of the initiator and a part or all of the monomers (B1)–(B5) are added and the polymerization is initiated, wherein any remaining amounts of initiator and monomers are metered in during the polymerization.

23. A binder for a coating composition comprising the self-crosslinking aqueous polymer dispersion as claimed in claim 1.

* * * * *